United States Patent [19]

Müller

[11] Patent Number: 4,591,446
[45] Date of Patent: May 27, 1986

[54] METHOD OF FILTERING AND A DEVICE FOR FILTERING SOLID-CONTAINING LIQUIDS

[75] Inventor: Hans Müller, Erlenbach, Switzerland

[73] Assignee: DrM Dr. Müller AG, Mannedorf, Switzerland

[21] Appl. No.: 638,885

[22] Filed: Aug. 8, 1984

[30] Foreign Application Priority Data

Aug. 8, 1983 [CH] Switzerland ............... 4290/83

[51] Int. Cl.⁴ .............................................. B01D 29/12
[52] U.S. Cl. .................................. 210/797; 210/323.2; 210/332; 210/407; 261/76
[58] Field of Search ............ 210/772, 791, 797, 323.2, 210/332, 407; 261/36 R, 76, 4, DIG. 75

[56] References Cited

U.S. PATENT DOCUMENTS

| | | | |
|---|---|---|---|
| 955,836 | 4/1910 | Moore | 210/772 |
| 1,043,455 | 11/1912 | Neil | 210/791 X |
| 2,020,850 | 11/1935 | Myhren et al. | 261/DIG. 75 |
| 2,083,578 | 6/1937 | Roberts | 210/772 X |
| 2,956,944 | 10/1960 | Logan et al. | 210/772 X |
| 4,163,724 | 8/1979 | Muller et al. | 210/323.2 |
| 4,220,612 | 9/1980 | Degner et al. | 261/DIG. 75 |
| 4,265,771 | 5/1981 | Lennartz et al. | 210/791 X |
| 4,405,466 | 9/1983 | Giannelli et al. | 210/323.2 X |
| 4,439,327 | 3/1984 | Muller | 210/791 X |
| 4,446,030 | 5/1984 | Schmidt, Jr. | 210/332 X |

FOREIGN PATENT DOCUMENTS 631352 8/1982 Switzerland.
1088524 10/1967 United Kingdom ............ 210/323.2

*Primary Examiner*—Richard L. Chiesa
*Attorney, Agent, or Firm*—Michael J. Striker

[57] ABSTRACT

In a filter pressure container provided with a plurality of vertically suspended tube-like filter elements having a filter cloth thereon the filtration of residual volumes of a liquid being filtered and the rinsing-out of the filter cakes built up during the filtration on the filter cloth are carried out by pumping out of the residual liquid or the rinsing liquid from the container by pump into an injector mounted in the container above the filter elements. The injector sprays out the residual liquid or the washing liquid over the filter elements while a pressure gas or air is simultaneously supplied into the container to force the liquid mist through the filter elements.

10 Claims, 1 Drawing Figure

U.S. Patent    May 27, 1986    4,591,446
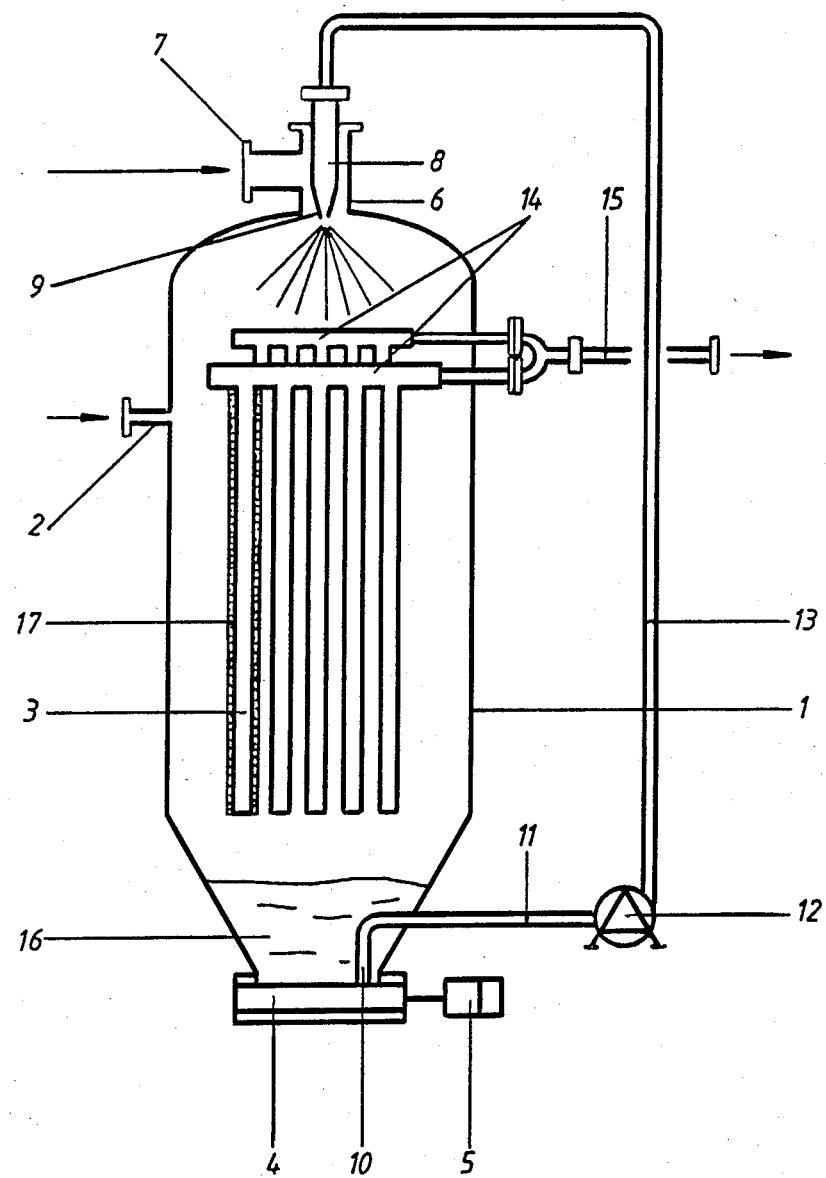

METHOD OF FILTERING AND A DEVICE FOR FILTERING SOLID-CONTAINING LIQUIDS

BACKGROUND OF THE INVENTION

The present invention pertains to a method of filtering liquid media and to a pressure filter, and particularly to a filter which employs a plurality of vertically suspended tube-like filters having a filter cloth through which the liquid being filtered is passed.

The filtration of the residual volumes of the filtered liquid by means of a pressure filter has been disclosed, for example in Swiss Pat. No. 631,352. A pressure filter described in the Swiss patent includes vertical filter elements, and the filtration of the residual volumes of the liquid being filtered is carried out within the filter element.

The non-filtered residues of the liquid remain in the filter container in a suspension state below the filter elements, and if they are valuable they are returned to an output container, or vanish.

The disadvantage of the conventional methods is that relatively large amounts of washing liquid are required for rinsing out filter cakes deposited on the filter cloth of the filter elements.

SUMMARY OF THE INVENTION

It is an object of the present invention to provide an improved method of filtration of residual volumes of non-filtered liquid and at the same time to rinse out the filter cake built up on the filter fabric during the filtration process.

These and other objects of this invention are attained by a method of filtering residues of a filtered liquid in a pressure container having an upper portion and a bottom portion, and a plurality of filter elements provided with a filter fabric, through which a liquid to be filtered is passed, and which is subjected to depositing of a filter cake during the filtering process, the method comprising the steps of collecting residues of the filtered liquid in the bottom portion of said container; pumping said residues out from said container; providing an injector in said upper portion; conveying said residues into said injector; and spraying said residues by means of said injector over said filter elements to completely filter out said residues.

The spraying of the non-filtered residues onto the filter elements has the advantage that the complete filtering-out of the suspension collected in the pressure container is carried out. The spraying must be so performed that a liquid mist is formed in the pressure container.

The pressure container preferably includes a plurality of vertical tube-shaped filter elements. However, any other construction of the filter elements on which filter cakes are deposited can be suitable for process of this invention.

A rinsing or washing liquid fed into the injector from outside of the container may be sprayed over the filter elements to wash out the filter cakes.

It is advantageous that gas or air is supplied under pressure into said container simultaneously with said spraying step to force said residues through said filter elements.

The pressure air or any other suitable gas flows through the filter cakes and carries the sprayed liquid mist thereby. The mist follows the stream of air or gas which is forced through the filter cakes in the direction of filtration. The cleaning of the filter cakes by the liquid mist results in a condensate which is forced through the filter cakes as a liquid. The solid material contained in the liquid is separated from the latter during the filtration of the residual volumes of non-filtered liquid. If a washing liquid is utilized it is finely dispersed so that a washing of filter cakes takes place.

Said pressure of gas or air may be 2 to 10 bar, whereby the resistance of the filter cakes is easily overcome.

Air can be fed into the container either before the nozzle of the injector or into the nozzle of the injector. This is advantageous because a great stream speed is obtained by means of auxiliary gas in the outlet of the nozzle. It has been found that with relatively small pressures of the gas being fed into the container as well as of the liquid being filtered a fine distribution of droplets and atomization are obtained. However, relatively large amounts of auxiliary gas have been required.

The gas or air may be fed immediately into the pressure container. The auxiliary gas may be fed into the container either through a nozzle outlet or at any other suitable locations of the pressure container. This has the advantage that small amounts of auxiliary gas are required while the pressure, which is necessary for spraying of the liquid over the filter elements, should be high.

The objects of the present invention are further attained by a pressure filter for filtering liquid containing solids, comprising a pressure container having an upper portion; a plurality of vertically suspended tube-like filter elements disposed in said container and provided with a filter fabric through which a liquid to be filtered is passed and which is subjected to depositing of a filter cake during the filtering process; said container having a bottom portion in which residues of the filtered liquid are collected; pump means positioned outside of said container and connected to said bottom portion for pumping therefrom said residues; conduit means disposed outside said container and connected to said pump means for conveying the pumped-out residues from said pump means to said upper portion; and pressure gas feeding means positioned at said upper portion to feed into said container pressure gas which forces said residues through said filter elements to completely filter out said residues.

The filter may further include injector means positioned in said upper portion and receiving said residues from said conduit means, said injections means spraying said residues over said filter elements. The advantage of such a construction resides in that no rotary components are required in the filter, and the maintenance of such filter is very inexpensive.

The upper portion of the pressure container may be tubular, said injector means including a nozzle, said nozzle being positioned in said container below gas feeding means. Therefore the injector is comprised from one nozzle which sprays the particles of the suspension so that the nozzle is not clogged.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The sole figure of the drawing shows a schematic elevational view through a filter according to the invention.

DETAILED DESCRIPTION OF THE PREFERRED EMBODIMENT

Referring now the drawing more specifically, the filter for filtering residual solid-containing liquids and for rinsing-out filter cakes deposited in the filter comprises a pressure container 1 which is substantially cylindrical with a conical lower portion. An infeed or inlet tube 2 for introducing a media to be filtered under pressure is provided in the upper region of a plurality of filter elements 3 vertically suspended in container 1 and being each of a tube-like or candle-like configuration. A slide valve 4, which is actuated by an electric motor 5 is provided in the bottom of container 1. A tubular portion 6 extends upwardly from the pressure container through its cover. A tube 7 is laterally mounted to the tubular portion 6. A substantially cylindrical injector 8 provided with a nozzle 9 at the end thereof is inserted into the tubular portion 6. A vertical tubular conduit portion 10 terminates immediately before the slide valve 4 and merges into an outwardly extended tubular conduit portion 11 which in turn leads to a pump 12. A pressure conduit 13 connects pump 12 with the injector 8. The vertically suspended tube-like filter elements 3 are connected to respective collector tubes 14. As shown in the drawing, two groups of filter elements 3 with assigned collector tubes 14 are provided in the exemplified embodiment. It should be understood, however, that more than two groups or one group of the filter elements 3 could be provided within the pressure container. Collector tubes 14 extend through the outer wall of the pressure container 1 outwardly to a discharge conduit 15.

In operation, after the filtration carried out in the conventional fashion, has been completed filter residues 16 collected in the bottom portion of pressure container 1 are sucked out from the container through the conduits 10, 11 by the pump 12 and is then conveyed towards the nozzle 9 of the injector, from which the filter residue is sprayed over the filter elements 3 from above. The so-generated liquid mist is applied to and flows through the filter web 17 of the filter elements 3 whereas at the same time pressure air is supplied into the container via the tube 7. The application of the pressure air or any other suitable gas forces the residues through the filter elements 3 and ensures a complete filtering out of the residual solids. A washing liquid can be also sprayed from injector 8 onto the filter elements for rinsing out the filter cakes.

EXAMPLE

During the filtration of common oils containing bleaching earth it is desired for the reasons of efficiency to completely filter out individual particles contained in the oil. The bleaching oil contains about 1% of bleaching earth which must be filtered out.

About 20,000 liters of oil containing 1% of bleaching earth can be pumped through the filter elements having 10 m$^2$ of the filtering surface. The filtered oil is discharged out of the container as a filtrate.

After the completion of the filtration the oil supply into the container is ceased whereas the filter container 1 is still filled with oil. Filter cakes of about 20 mm are built up in the known fashion on the webs 17 of filter elements 3. Now pressure air of about 2 bar is fed into container 1 via the tube 7. At the same time pump 12 is set into operation whereby residual volumes of the oil which contain the bleaching earth are forced by pump 12 into conduit 13 and into the injector 8. The oil mist sprayed out from nozzle 9 is carried over by the pressure air supplied from tube 7. Pressure air forces the mist to flow through the filter cloth 17 of the filter elements 3. The deeper the level of the residue oil sinks in the filter container 1, the more air and oil mist flow through the filter elements 3. When the tubes of filter elements 3 are free of oil and while the level of the residual oil sinks to its lowest end the oil mist still flows through the filter cakes and for so long unless pump 12 pumps no more oil out from the container 1 and unless the container 1 is completely emptied. The filtration of residual volumes of the liquid being filtrated is conducted during the time period which is selected in accordance with the type and temperatures of the oil being processed and independent from the content of the bleaching earth in the oil; this time period is normally 15–45 minutes. The removal of the filter cakes from the webs of the filter elements 3 is performed in the known fashion, for example by backwashing.

The method according to the present invention is suitable not only for an efficient filtering of residual volumes of liquids being filtered but also for effective rinsing out of the filter cakes formed on the surfaces of the filter elements 3.

It is preferable to use a pressure filter comprising vertically suspended tube-like filter elements in the method of this invention because the liquid mist can reach the filter cloth of the vertical filter elements at all sides thereof.

It will be understood that each of the elements described above, or two or more together, may also find a useful application in other types of methods and devices for filtering out liquids differing from the types described above.

While the invention has been illustrated and described as embodied in a method and a filter for filtering out residual solids contained in liquids, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of filtering non-filtered residual suspension of a filtered liquid in a pressure container having an upper portion and a bottom portion, and a plurality of tube-like filter elements vertically suspended in said container and provided with a filter fabric through which a liquid to be filtered is passed and which is subjected to depositing of a filter cake during the filtering process, the method comprising the steps of collecting a residual suspension of the non-filtered liquid in the bottom portion of said container; pumping said suspension out from said container; providing an injector in said upper portion; conveying said pumped-out suspension upwardly immediately into said injector; spraying said suspension by means of said injector over said filter elements; and feeding gas into said container immediately at said upper portion whereby said suspension is forced through said filter elements and is completely filtered out.

2. The method as defined in claim 1, further including a step of rinsing out said filter cakes by a washing liquid sprayed onto said filter elements by said injector.

3. The method as defined in claim 1, wherein said feeding step includes supplying gas under pressure into said container simultaneously with said spraying step.

4. The method as defined in claim 3, wherein said gas is air.

5. The method as defined in claim 3, wherein said pressure is 2 to 10 bar.

6. The method as defined in claim 3, said injector having a nozzle, the gas being supplied into said container at said upper portion in the region of said injector.

7. The method as defined in claim 3, said injector having a nozzle, the gas being supplied into said container at said upper portion before said nozzle.

8. The method as defined in claim 3, wherein gas is fed immediately into said container.

9. A pressure filter for filtering liquid containing solids, comprising a pressure container having an upper portion; a plurality of vertically suspended tube-like filter elements disposed in said container and provided with a filter fabric through which a liquid to be filtered is passed and which is subjected to depositing of a filter cake during the filtering process; said container having a bottom portion in which a residual suspension of a non-filtered liquid is collected; pump means positioned outside of said container and connected to said bottom portion for pumping therefrom said suspension; injector means positioned in said upper portion of said container; conduit means disposed outside said container and connected to said pump means for immediately conveying the pumped-out suspension from said pump means upwardly into said injector, said injector means spraying said suspension over said filter elements; and pressure gas feeding means positioned at said upper portion to feed into said container pressure gas which forces said suspension through said filter elements to completely filter out said suspension.

10. The pressure container as defined in claim 9, wherein said upper portion is tubular, said injector means including a nozzle, said nozzle being positioned in said container below gas feeding means.

* * * * *